Figure 1:
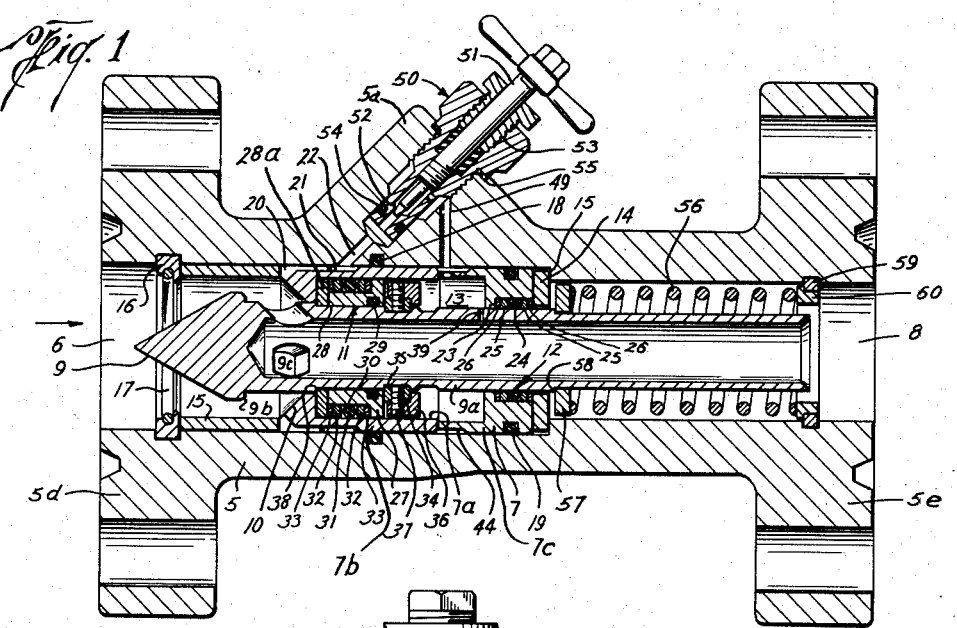

Aug. 25, 1959  J. H. BOSTOCK  2,900,997
PRESSURE RESPONSIVE VALVE
Filed July 17, 1953

James H. Bostock
INVENTOR.

BY
ATTORNEYS

United States Patent Office 2,900,997
Patented Aug. 25, 1959

2,900,997

PRESSURE RESPONSIVE VALVE

James H. Bostock, Dallas, Tex., assignor to Otis Engineering Corporation, Dallas, Tex., a corporation of Texas Application July 17, 1953, Serial No. 368,742

15 Claims. (Cl. 137—458)

This invention relates to improvements in pressure responsive valves and refers more particularly to that class of device which serves as a safety control valve or safety device to close off a conduit upon occurrence of a predetermined pressure condition within a control pressure.

Safety control valves of this general type are known to the art such as that shown in United States Letters Patent, No. 2,679,261 issued May 25, 1954 for Pressure Responsive Valve to Herbert C. Otis. Safety control devices such as shown in the Otis patent have been very satisfactory in service under all but the most severe conditions. However, during the opening operation of valves of this type the impact of the valve member against the stop that limits its travel in the opening direction has presented a problem, which has limited their use to small sizes and pressures of preferably less than 4,000 p.s.i. The large opening impact force is destructive of the valve parts and is due to the storing of energy in the relatively large volume pressure chamber to provide the necessary force to initially unseat the valve member which is held shut by the pressure differential across the seated valve member, which differential immediately reduces upon initial unseating of the valve member. Thus, the ratio of the opening force to the forces opposing opening rises to provide an impact force which is necessarily a function of both the valve size and the pressure to be handled.

Also, some difficulty has occasionally been experienced due to shutting of the valve under influences of extreme pressure surges when controlling high pressure gas wells. While such incidents have been extremely rare; it is desirable to further reduce the likelihood of shutting of the valves by pressure surges, without increasing the strength of the spring which is usually used for this purpose.

It is further desirable to reduce as much as possible the time required for the valve to shut when a dangerous pressure condition exists, particularly where the device is used to close a line in the event of a line break. If the line break happens to be closely adjacent the safety device, the latter must close before the pressure can drop immediately upstream of the valve or it may not shut against the force of the spring usually used to resist shutting of the valve by pressure surges. In addition, the cost of manufacture of the devices can be reduced by simplifying the machining problem presented by the need for widely spaced concentric bearing and sealing surfaces.

It is an object of this invention to provide a safety device which may be opened by pressure which extends the application of such devices to uses not heretofore feasible because of the problems outlined above.

Another object is to provide a safety device, operated by the pressure within the line controlled, which is very rapid in its closing upon occurrence of a dangerous pressure condition reducing the likelihood of dissipation of line pressure before the device can close.

Another object is to provide a safety device in which the opening force acting in a direction to unseat the valve member reduces during its movement from its seat to full open position.

Another object is to provide a pressure responsive control for a safety device in which the ratio of the volumes of the control chamber, with the valve member of the device in fully open and seated positions, is utilized to control the opening force applied to the valve member and to reduce the likelihood of the device closing under the influence of pressure surges.

Another object is to provide a safety device in which the volumetric capacity of the control chamber increases sufficiently during opening movement of the valve member to reduce the pressure of expansible fluid therein to thereby decrease the opening impact of the valve member against the stop means, which determines its full open position.

Another object is to provide a control for a safety device in which the fittings for receiving the venting and pressurizing equipment for the control, and the conduits leading thereto, are taken into account in controlling the magnitude of the force applied to the valve member of the device in an opening direction to vary same in accordance with the varying requirements, both during opening of the device and during its normal operation.

Another object is to provide in a pressure responsive control for a safety device a spring, which resists closing of the device by line pressure surges, is positioned so as not to affect the volume of the pressure chamber of the control.

Another object is to provide a valve of the character described in which the parts of the valve body which provide seals or bearings for the extension carried by the valve member may be positioned closely together along the longitudinal axis of the extension to reduce the likelihood of any misalignment therebetween and simplify the machining requirements.

Another object is to provide a pressure responsive control for a safety device having a removable insert means which carries all of the bearings and seals for slidingly mounting an elongate tubular stem on which the valve member for the device is mounted, and the seat for the valve, thus lending itself to economical and accurate fabrication.

Another object is to provide a valve of the character described in which any movement of the valve member toward its seat due to surges of pressure fluid will be opposed by a rapid increase in pressure within the control chamber without injecting additional expansible fluid into the chamber, thus giving better control of the valve against accidental closure due to pressure surges within the conduit within the operating pressure limits of the safety device.

Another object is to provide a safety device controlled by line pressure in which very little line fluid is lost when the device is closed.

Other and further objects of the invention will appear as the description proceeds.

Figure 2:
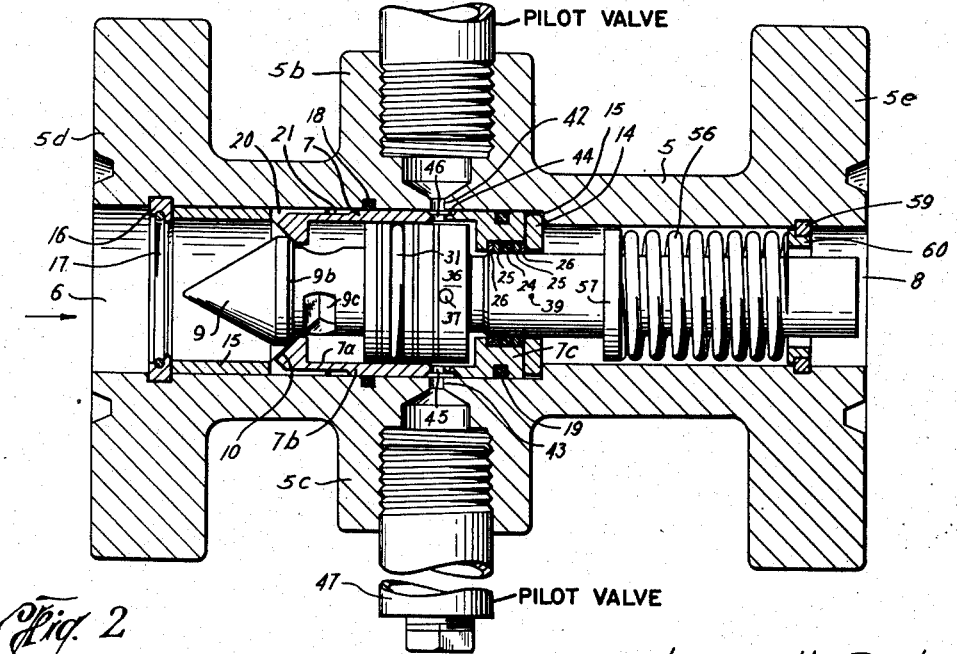

In the accompanying drawings forming a part of the instant specification and illustrating one embodiment of this invention, and wherein like reference numerals are used to indicate like parts in the various views:

Fig. 1 is a view in vertical section through a valve embodying this invention; and Fig. 2 is a sectional view through the valve of Fig. 1 with the valve rotated 90° from its Fig. 1 position.

Referring to the drawings, in general the safety device comprises a body 5 with a passageway therethrough made up of bore 6 and a smaller diameter bore 8. Means are provided within the passageway to slidably mount valve member 9 and its tubular extension 9a. This means also provides a seat 10 for the valve member and a chamber in which a pressure responsive member 11 is mounted. Obviously, when a pressure differential exists across the pressure responsive member, the valve may be moved thereby, relative to seat 10, to control opening and closing of the device.

Means are provided to alter the pressure within sealed chamber 13 to selectively provide the differential to control opening or closing of the device. The total volumes of chamber 13, in the two positions of the valve member, are such that for any movement of the valve member and piston 11, there is a high rate of change of the volume of the chamber. This, of course, has an immediate effect upon the pressure of an expansible fluid within the chamber thereby controlling the magnitude of the force in the opening and closing direction. This is utilized to reduce the opening impact and to reduce the likelihood of line pressure surges closing the valve.

Valves constructed in accordance with this invention are particularly useful in the control of flow from oil and gas wells and in other applications where pressures on the order of thousands of pounds per square inch are encountered.

Referring to the more detailed aspects of the illustrated embodiment of the invention, valve body 5 is provided with flange ends 5d and 5e to facilitate installation in a flow conduit to be controlled.

Stop ring 14 is positioned in bore 6 in abutment with shoulder 15 between bores 6 and 8. A removable seat insert, made up of two parts 7b and 7c, is held between stop ring 14 and spacer 15 by split ring 16, which resides in a circumferential groove in the body. A retainer spring 17 holds the split ring in its groove. O-ring seals 18 and 19, which reside in circumferentially formed grooves in the body and insert respectively, seal between the body and seat insert. The insert part 7b is provided with seat portion 10, facing upstream, which cooperates with valve member 9 to control flow through the passageway provided by bores 6 and 8. Circumferentially spaced about the seat end of the inert are vanes 20 terminating in a collector groove 21 allowing upstream expansible fluid to pass into conduit 22.

Valve 9 has a tapered portion 9b which engages seat 10. The valve member is connected to a tubular member 9a. The tubular member is slidably mounted in the body, and extends through both seat insert parts.

A sliding seal is provided between the tubular member and the seat insert. The insert has an inwardly extending flange portion 23 which, together with stop ring 14, provides an inwardly facing groove. O-ring 24 is positioned in this groove between backup rings 25. The backup rings are in turn positioned between bearing rings 26. Backup rings 25 are machined with very close tolerance to the outer periphery of tubular member 9a and may be fabricated of a material having lubricating qualities such as certain plastics as, for example, polytetrafloroethylene, available commercially under the trademark "Teflon."

The tubular member 9a carries a pressure responsive member indicated generally at 11 which operates within bore 7a of seat insert 7. In this embodiment, the pressure responsive member is a piston 27 having an internal bore 28 closely fitting about the tubular member 9a. A seal between the piston and tubular member is provided by O-ring 29 positioned in an internal circumferential groove in piston 27. Piston 27 is provided with an outer peripherial groove 30. This groove carries O-ring 31 between backup rings 32, which may be of relatively hard plastics or the like, which in turn are positioned between bearing rings 33. Piston 27 is held against outwardly extending shoulder 38 on extension member 9a by split ring 34. Split ring 34 is held in a peripherial groove 35 on extension member 9a by a split ring cover 36 and set screws 37.

O-ring 31 effects a sliding seal between the piston and seat insert. Piston 27 urges valve 9 toward or away from seat 10 in response to the pressure differential thereacross.

To complete the flow passageway through the body, the tubular extension 9a is utilized. It is provided with ports 9c adjacent the valve member and the piston so that fluid flow by-passes the piston 27 and the seal between insert part 7c and the extension 9a, when the valve member is in open position. When the valve member is seated, this by-pass is closed.

The use of spacer 15 permits shielding of the valve body from corrosive fluids traveling at increased velocities around the head of the valve. This wear sleeve may be made of material which is highly resistant to both corrosion and flow cutting and is replaceable.

A means for providing an expansible control pressure fluid to chamber 13 may include a choke orifice or bleed opening 39 in tubular member 9a. This supplies expansible pressure fluid to chamber 13 from the fluid passing through tubular member 9a. The arrangement of the opening 39 is such that it is ineffective to pressurize the control chamber when the valve is in closed position. This is true because the opening 39 will be to the right of seal ring 24. In the interest of quick venting of chamber 13 to speed up the closing of the valve, it is preferred to position hole 39 so it passes the seal member very quickly upon initial movement of the valve member in a closing direction. This also limits the amount of expansible fluid that will escape from the control chamber upon venting of this chamber to a very small amount. In addition, it helps combat accidental closure of the valve member due to pressure surges in the line because quick closing of this bleed port prevents flow of expansible fluid from chamber 13 as the pressure therein builds up due to movement of piston 27 in a direction to reduce the volume of the chamber.

Body 5 is provided with bosses or fittings 5b and 5c which receive pilot relief valves 48 and 47, respectively. Communication between these fittings and chamber 13 is established through conduits 42 and 43, respectively, and a peripheral groove 44 and ports 45 and 46 in the seat insert. In the embodiment illustrated two pressure relief or pilot valves 47 and 48 are shown schematically, one adapted to open upon occurrence of a predetermined low pressure within the control chamber, and the other to open upon occurrence of a predetermined high pressure in the control chamber. While any suitable relief valves may be used for this purpose, valves of the type shown in United States Letters Patent No. 2,566,772, issued to Herbert C. Otis on September 4, 1951, are preferred because they are arranged to open very quickly with a snap action upon the occurrence of the particular pressure at which they are to open. It will be understood that bleed opening 39 is smaller in size than the vent passageways in the seat insert and body leading to the pressure relief valves as well as the flow passageways in the relief valves when open, so that pressure within the control chamber may be relieved more rapidly than pressure may be charged through bleed opening 39 in order to effect closing of the valve.

Upon occurrence of a predetermined high or low pressure condition, the pressure chamber 13 is vented to the atmosphere by action of one of the relief valves and valve 9 is quickly seated. Upon passing the bleed 39 past O-ring 24, no further expansible fluid will escape from the flow passageway in the valve as bleed 39 will no longer lead into chamber 13.

The effective pressure face of pressure responsive member 11 is designed to have a greater area than the sum of the areas across the valve seat 10 and the seal provided by O-ring 24 on the periphery of tubular member 9a. With this arrangement of the particular areas involved, upstream pressure may be led into the pressure chamber to provide a resultant force urging the tubular member toward open position. The relationship of these areas is explained in the Otis patent, referred to above, and further explanation is omitted from this specification in the interest of simplicity.

A means is preferably provided to always urge the valve member in an opening direction. Its chief function is to resist closing of the valve by excessive pressure surges in the line, and it also assists in opening of the valve. This means may include a spring 56 mounted within bore 8. The spring urges tubular member 9a in an opening direction to move valve member 9 away from its seat. The spring is arranged between spring guide 57, which abuts an external shoulder 58 on tubular member 9a and a split ring 59 and ring retainer 60. It surrounds the tubular extension and thus is out of the fluid flow through the device so as not to be subject to erosion. In the event the pressures acting upon the valve and the pressure responsive member are substantially in balance, spring 56 will keep the valve in open position.

Opening means for the safety device includes a valve controlled arrangement for selectively pressurizing chamber 13. Preferably, the conduit controlled by the safety device is the source of the expansible fluid which is utilized to pressurize the chamber. In the embodiment of the drawings, the opening means includes a conduit 49 opening into collector groove 44 and communicating with conduit 22 through by-pass valve 50 positioned in boss 5a, which controls pressurization of the control chamber with expansible fluid existing upstream of the seat 10. Needle valve 51 cooperates with seat 52 to control flow through the valve. Valve 50 is provided with a conventional stuffing box 53 and seals 54 and 55 to prevent flow of expansible fluid except through seat 52.

When it is desired to open the valve, the relief valves are first checked and if one is open, it is closed. Then needle valve 51 is opened to admit upstream pressure to the control chamber. Upon the forces tending to open the valve reaching the magnitude of the forces tending to retain the valve upon its seat, the valve will be free to move from its seat. Up to this point, there is normally a high pressure differential across the valve 9 but upon the valve moving from its seat, this differential will abruptly decrease because the fluid in chamber 13 is expansible. It is not known just what differential exists instantaneously upon movement of the valve member from its seat, but it is known that it reduces nearly instantaneously to a much lower magnitude. Thus, there will be suddenly removed a force acting in the valve closing direction, equal to the product of the difference in these pressure differentials acting across the area of the seated valve member. Thus, the force of the pressure acting within the control chamber against the piston 27 rapidly moves the valve away from its seat until the pressure responsive member strikes the seat insert. The impact of the valve member and piston against the seat insert is controlled, in accordance with this invention, by reducing the pressure within the chamber 13 as the valve member moves toward open position (by expanding the expansible fluid in the chamber 13), to thus simultaneously reduce the force acting on the piston in a valve opening direction.

It will be noted that spring 56 is mounted outside of the control chamber permitting the pressure responsive member 11 to be positioned closely adjacent the sliding seal provided by a seal 24 when the valve 9 is seated. With this arrangement, the volumetric capacity of the chamber 13 will increase at a high rate as the valve member moves from its seat. This reduces the pressure of the expansible fluid in the chamber so that at the time the valve member reaches full open position the force due to the reduced pressure acting against the piston to open the device is reduced whereby the opening impact of the piston striking the stop or seat insert 7b is controlled and maintained within acceptable limits. The pressure acting upon the piston 27 exteriorly of chamber 13 also increases during this finite period of time while the valve is opening, thereby further reducing the opening impact. During the opening movement of the valve member, additional expansible fluid will be supplied to the chamber through the by-pass valve, but the rate at which the expansible fluid can enter the chamber is kept low by the choke characteristics of the needle valve and is not great enough to make any appreciable difference in the pressure conditions therein, due to the snap action of the valve member 9.

The space within fittings 5a, 5b, and 5c, which is not filled by the valves mounted therein, as well as conduits 42, 43 and 49, together with collector groove 44, comprise what may be termed part of the control chamber. These should be kept small and considered in the design of the control chamber.

By reference to Fig. 2, it will be noted that the position of piston 27 relative to sliding seal 12, when the valve is seated, is such that that portion of the volumetric capacity of the control chamber which resides within the seat insert is less than that portion of the volumetric capacity which lies within the fittings and conduits. In other words, the control chamber of the prior art has been substantially eliminated, when the valve is seated and the volume within the conduits and fittings, which make up part of the control chamber, is utilized as a functioning portion of the control chamber.

It has been found that with intermediate pressure conditions to be controlled by the safety device the ratio of volumes of chamber 13 with the valve member in its seated and open positions should be on the order of 1 to 2 to obtain satisfactory results in accordance with this invention. If desired, the impact may be further reduced by providing a ratio of as much as three to one or more where the valve size is large or the pressures extreme, as in excess of 4,000 p.s.i. The ratio will depend upon the size and design of the valve as well as the amount of reduction in impact desired. For example, the valve illustrated is a 2 inch valve which was constructed in accordance with this invention and found to be highly satisfactory with an expansion ratio of 1 to 2.94 in systems having very high pressures exceeding 4,000 p.s.i.

These same volume ratios have been found to satisfactorily resist accidental closing of the valve under even extreme conditions of line surges such as encountered in controlling high pressure gas and distillate wells where pressure heads develop within the well and create high pressure surges, which have been known to close the valves of the prior art on occasion.

It will be appreciated that the valve seat, the pressure responsive member and the sliding seal must be concentric and be machined to fine tolerance. By bringing these surfaces close together and included in removable inserts, accurate machining is much more easily accomplished upon a manufacturing scale.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In a safety device, a body with a flow passage, a valve seat in the passage, a valve member urged toward the seat by upstream pressure, a tubular extension on the valve member extending through the seat and carrying a piston, means slidably mounting the tubular extension and providing a sealed control chamber for the piston with the one pressure face of the piston exposed to the control chamber and the other exposed to the passage downstream of the seat, the extension by-passing the sealed chamber, and choke means for selectively communicating between the sealed chamber and the passage upstream of the seat to supply an expansible pressure fluid to the chamber, said piston being movable by pressure of fluid in said chamber in a direction opposite that which said upstream pressure urges the valve member as aforesaid, the ratio of volumes of the chamber, with the valve member in open and seated positions being at least 2:1 such that movement of the piston results in high rate of change of the volume relative to the length of piston travel.

2. A high pressure safety device having a body with a passageway therethrough, a valve member and a seat controlling the passageway, means providing a sealed pressure chamber within the passageway with a piston reciprocally mounted therein to vary the volume thereof, said piston connected to the valve member and movable to unseat the valve member against upstream pressure acting on the valve member, said piston being exposed exteriorly of the chamber to pressure within the passageway downstream of the seat, an opening in the chamber for venting the chamber controllable by a pilot relief valve, means for supplying an expansible control pressure fluid to the chamber only when the valve member is in full open position and interrupting such supply upon movement of the valve member toward seated position, choke means for selectively admitting an expansible pressure fluid to the chamber when the valve member is seated to provide a force due to pressure acting against the piston to unseat and snap the valve member to open position, the construction and arrangement of the means providing the sealed chamber being such that the volume of the chamber at least doubles as the valve is snapped from seated to open position and this together with the small flow capacity of the choke means produces a reduction of the opening impact force of the valve member as it attains full open position to within acceptable limits.

3. A high pressure safety device having a body with a passageway therethrough, a valve member and a seat controlling the passageway, means providing a sealed pressure chamber within the passageway including a piston reciprocally mounted therein to vary the volume thereof, said piston connected to the valve member and movable to unseat the valve member against upstream pressure acting on the valve member to urge it to its seat, said piston having a pressure face exposed exteriorly of the chamber to pressure within the passageway downstream of the seat, an opening in the chamber for venting the chamber controllable by a pilot relief valve, means for supplying an expansible pressure fluid to the chamber only when the valve member is in substantially full open position and interrupting such supply responsive to movement of the valve member to seated position, choke means for selectively admitting an expansible pressure fluid to the chamber when the valve member is seated to provide a force due to pressure acting against the piston to unseat and snap the valve open, the construction and arrangement of the means providing the sealed chamber being such that the volume of the chamber at least doubles during movement of the valve member so that a high rate of change of pressure occurs in said chamber during such movement, the flow capacity through the choke means being so small as to be negligible in its effect to maintain a constant pressure within the chamber while the valve member is being snapped open.

4. In a safety device of the type having a body with a passage therethrough and a valve member having a tubular extension, a cylindrical insert means removably mounted within the passage, carrying a valve seat cooperable with the valve member to control the passage and a sealing and bearing means slidably mounting the tubular extension and valve member within the passage, said insert means providing an internal cylinder between the bearing means and seat, a pressure responsive means carried by the tubular extension reciprocally mounted within the cylinder and sealing between the tubular extension and the cylinder, pressure responsive means being movable in a direction to unseat the valve member against upstream pressure acting on the valve member, said seat and said sealing and bearing means being spaced a distance apart such that when the valve member is seated, the sealing and bearing means is closely adjacent the pressure responsive means, the tubular extension providing a flow passage by-passing the cylinder, and means for selectively conducting an expansible fluid from and to the sealed off portion of the cylinder to vent and pressurize the sealed off portion of the cylinder to provide pressure differentials across the pressure responsive means to thereby provide for opening and seating of the valve member.

5. The safety device of claim 4 wherein the insert means contains a cylindrical extension extending coaxially from the seat on the opposite side from the cylinder and the tubular member has flow openings adjacent the valve member, and at least a portion of the flow openings reside within the insert means extension when the valve member is in fully opened position whereby the insert means extension provides a replaceable wear member to resist erosion and corrosion due to flow of fluid through the safety device.

6. In a safety device of the type having a body with a passage therethrough and a valve member with a tubular extension, a cylindrical insert means removably mounted within the passage carrying a valve seat cooperable with the valve member to control the passage and a sealing and bearing means spaced from the seat slidably mounting the tubular extension and valve member within the passage, the seat insert means providing an internal cylinder between the bearing means and the seat, piston means carried by the valve member and its tubular extension reciprocally mounted within the cylinder and sealing between the tubular extension and the cylinder, the tubular extension providing a flow passage by-passing the sealed off cylinder, the piston means being movable to unseat the valve member in opposition to upstream pressure applied thereagainst, the volume of the cylinder between the piston means and the sealing and bearing means being substantially filled by the piston means when the valve member is seated thereby substantially eliminating space to receive a pressure fluid, and means for selectively conducting an expansible fluid from and to the cylinder to vent and pressurize the cylinder to provide pressure differentials across the piston to thereby provide for unseating and seating of the valve member.

7. In a safety device of the type having a body with a passage therethrough and a valve member with a tubular extension, a cylindrical insert means removably mounted within the passage carrying a valve seat cooperable with the valve member to control the passage and a sealing and bearing means spaced from the seat slidably mounting the tubular extension and valve member within the passage, the seat insert means providing an internal cylinder between the bearing means and the seat, a piston means carried by the valve member and its tubular extension reciprocally mounted within the cylinder and movable in a direction to unseat the valve member against upstream pressure acting on the valve member to urge it toward its seat and sealing between the tubular extension and the cylinder, the tubular extension providing a flow passage by-passing the sealed off cylinder, the volume of the cylinder between the piston means and the sealing and bearing means being substantially filled by the piston means when the valve member is seated thereby substantially eliminating space to receive an expansible pressure fluid, a spring mounted in the body passage, exterior of the cylinder, and arranged to urge the valve member in an unseating direction, and means for selectively passing an expansible fluid from and to the cylinder to vent and pressurize the cylinder to provide pressure differentials across the piston means to thereby provide for opening and seating of the valve member.

8. In a pressure responsive valve having a flow passageway with a seat therein and a valve member mounted in the passageway for sliding movement between unseated and seated positions to control flow through the passageway, the improvement which resides in the combination therewith of a chamber provided in the body passageway, a pressure responsive member carried by the valve member and mounted for movement in the chamber to vary the volume of the chamber and movable in a direction to unseat the valve member against pressure acting on the valve member to urge it towards its seat, means to selectively supply an expansible pressure fluid to the chamber from the body passageway at a controlled rate, said chamber having a volumetric capacity with the valve member in open position which is at least twice as great as the capacity of the chamber with the valve member seated to reduce the pressure of the expanding fluid in the chamber during the movement of the valve from its closed to its open position to thereby reduce the opening impact of the valve member.

9. The arrangement of claim 8 wherein the chamber is pressurized through a choke means.

10. A pressure responsive valve comprising a body having a flow passageway with a seat therein, a valve member slidably mounted in the passageway for movement between unseated and seated positions to control flow through the passageway, a tubular member connected to said valve member and having a sliding seal with a portion of the body, a piston carried by the tubular member and having a sliding seal with the body to complete a variable volume control chamber surrounding the tubular member, said piston being movable under the influence of pressure in said chamber to unseat the valve member in opposition to upstream pressure acting thereagainst, an opening in the tubular member whereby it provides a part of the passageway and by-passes the control chamber, said piston being positioned sufficiently close to the seal between the tubular member and the body when the valve member is seated that the space therebetween is less than the travel of the valve member between seated and unseated positions so that movement of the piston in a direction to unseat the valve member increases the volumetric capacity of the chamber to such an extent as to substantially and materially reduce the force due to pressure of an expansible fluid within the chamber acting on the piston as the valve member moves from seated to full open position, and choke means for selectively supplying an expansible pressure fluid to the chamber when the valve member is seated, at such a low rate that it has little effect upon the pressure within the chamber during the time the valve member is moving from seated to unseated positions.

11. The arrangement of claim 10 wherein a spring is positioned in the passageway exterior of the chamber to urge the valve member away from its seat.

12. The arrangement of claim 10 wherein the portion of the body in which the piston slides is closely adjacent to the portion of the body which provides the sliding seal between the body and tubular member, and wherein said portions are closely adjacent to the valve seat to facilitate accurate fabrication of these portions and the seat in concentric relationship within very close tolerances.

13. The arrangement of claim 10 wherein the area of the pressure face of the piston exposed to pressure of an expansible fluid within the control chamber is greater than the area of the valve seat and the other pressure face of the piston is exposed to pressure fluid downstream of the seat with the valve member seated.

14. A pressure responsive valve comprising a body having a flow passageway therethrough, a valve member slidably mounted in the passageway and cooperable with a seat disposed transversely of the passageway to control the passageway, a stop means limiting movement of the valve member away from the seat, a tubular member connected to the valve member and extending through the valve seat, seal means between the tubular member and the body to provide a sliding seal therebetween, a pressure responsive member carried by the tubular member and positioned closely adjacent the sliding seal with the valve member in seated position, flow openings in the tubular member between the pressure responsive means and the valve member whereby the tubular member provides a portion of the passageway through the body by-passing the seal between the body and tubular member, said pressure responsive member sealingly and slidably engaging a cylindrical wall carried by the body to form with the tubular member and the wall a variable volume pressure chamber with the pressure face of the pressure responsive member exterior of the chamber exposed to pressure downstream of the seat with the valve member seated, bleed passage means for selectively supplying downstream pressure of an expansible fluid to the chamber when the valve member is in open position, a fitting opening into the chamber for receiving a pressure relief valve to vent the variable volume chamber upon occurrence of a predetermined pressure condition within the chamber, a spring positioned in the passageway and exterior of the chamber urging the valve member toward open position, and choke means including a conduit controlled by a by-pass valve to the chamber for selectively supplying upstream pressure of an expansible fluid to the chamber, said variable volume chamber comprising a portion of a control chamber whose volume with the valve member in full open position is at least double the volume of the control chamber with the valve member seated so that movement of the valve member in either direction within the limits of its movement results in sufficiently high rate of change in pressure of an expansible fluid within the chamber such that when the pressure of the expansible fluid in the chamber is increased to a value sufficient to move the valve member from its seat against a large pressure differential across the seated valve member, the unbalanced force condition resulting from a reduction in the differential across the valve member as it moves from its seat being substantially reduced by reduction in pressure in the chamber due to the increase in capacity of the chamber and concomitant expansion of fluid in the chamber as the valve is moving to open position to control the force of impact upon the stop, and the increase in pressure within the chamber as the valve member is forced toward its seat by pressure surges resisting accidental closing of the valve member by such surges.

15. A pressure responsive valve comprising a body having a flow passageway with a seat therein, a valve member slidably mounted in the passageway for movement between unseated and seated positions and urged against its seat by upstream pressure acting thereon, a tubular member connected to the valve member and having a sliding seal with a portion of the body, a piston carried by the tubular member and having a sliding seal with the body to complete a variable volume control chamber surrounding the tubular member, said piston being movable under the influence of pressure of an expansible fluid in said chamber to unseat the valve member in opposition to upstream pressure acting thereagainst, an opening in the tubular member whereby it provides a part of the passageway so that fluid flowing through the passageway by-passes the control chamber, said chamber having a volume when the valve member is in full open position which is at least twice the volume of the chamber when the valve member is in seated position so that movement of the valve member from seated to unseated position results in sufficient reduction in pressure of the expansible fluid within the chamber such that when the pressure in the chamber is increased to a value sufficient to move the valve member from its seat against a large pressure differential across the seated valve member, the unbalanced force condition resulting from a reduction in differential across the valve member as it moves from its seat will be substantially reduced before the valve member arrives at its full open position, and choke means for selectively supplying an expansible pressure fluid to the chamber when the valve member is seated at such a low rate of flow that it has little effect upon the pressure within the chamber during the time the valve member is moving from seated to unseated position.

References Cited in the file of this patent

UNITED STATES PATENTS

| | | |
|---|---|---|
| 2,205,033 | Dreyer | June 18, 1940 |
| 2,268,733 | Williams | Jan. 6, 1942 |
| 2,421,810 | Simpson | June 10, 1947 |
| 2,555,483 | Grant | June 5, 1951 |
| 2,583,295 | Greer | Jan. 22, 1952 |
| 2,583,384 | Mercier | Jan. 22, 1952 |
| 2,679,261 | Otis | May 25, 1954 |

FOREIGN PATENTS

| | | |
|---|---|---|
| 1,424 | Great Britain | Jan. 19, 1910 |